US007528615B2

(12) United States Patent
Shimotomai

(10) Patent No.: US 7,528,615 B2
(45) Date of Patent: May 5, 2009

(54) MEASUREMENT METHOD OF THE CURRENT-VOLTAGE CHARACTERISTICS OF PHOTOVOLTAIC DEVICES, A SOLAR SIMULATOR FOR THE MEASUREMENT, AND A MODULE FOR SETTING IRRADIANCE AND A PART FOR ADJUSTING IRRADIANCE USED FOR THE SOLAR SIMULATOR

(75) Inventor: Mitsuhiro Shimotomai, Okazaki (JP)

(73) Assignee: Nisshinbo Industries, Inc., Tokyo (JP)

( * ) Notice: Subject to any disclaimer, the term of this patent is extended or adjusted under 35 U.S.C. 154(b) by 48 days.

(21) Appl. No.: 11/343,215

(22) Filed: Jan. 31, 2006

(65) Prior Publication Data
US 2006/0238750 A1 Oct. 26, 2006

(30) Foreign Application Priority Data
Feb. 1, 2005 (JP) .............................. 2005-025534

(51) Int. Cl.
*G01J 1/00* (2006.01)
(52) U.S. Cl. .................. 324/752; 324/750; 324/765
(58) Field of Classification Search .................. None
See application file for complete search history.

(56) References Cited

U.S. PATENT DOCUMENTS 3,334,217 A * 8/1967 Bickler et al. .................. 362/2

(Continued)

FOREIGN PATENT DOCUMENTS

EP 0 887 652 A2 12/1998

(Continued)

OTHER PUBLICATIONS

F. Nagamine et al., "New Solar Simulator for Multi-Junction Solar Cell Measurements", Proceedings of the Photovoltaic Specialists Conference, Louisville, May 10-14, 1993, New York, IEEE, U.S. vol. Conf. 23, May 10, 1993, pp. 686-690.

A. Virtuani, et al., "Performance of Cu(In,Ga)Se$_2$ Solar Cells Under Low Irradiance", Preparation and Characterization, Elsevier Sequoia, NL, vol. 431-432, May 1, 2003, pp. 443-444.

(Continued)

*Primary Examiner*—Vinh P Nguyen
(74) *Attorney, Agent, or Firm*—Westerman, Hattori, Daniels & Adrian, LLP.

(57) ABSTRACT

In a solar simulator for measuring the current-voltage characteristics of photovoltaic devices, it is to provide a measurement method using a solar simulator in which locative unevenness of irradiance on the test plane of the test plane side is drastically improved, not in a light source side, and a means for adjusting irradiance and the like.

when an object is the photovoltaic devices Ms, and the current-voltage characteristics are measured by a solar simulator Ss equipped with a light source composed of a lamp and a reflector, and a part for setting the object to be measured, in which it is possible to dispose an irradiated test plane of the object to be measured opposite an illuminating surface of said light source, the whole test plane of said photovoltaic devices is divided imaginarily into a plurality of sections and a selected member for adjusting irradiance is disposed opposite the test plane of each imaginary sections so as to equalize or substantially to equalize the irradiance by the light source at every irradiated test plane of the sections, after which light from said light source is directed onto the test plane of the object to be measured.

11 Claims, 7 Drawing Sheets

U.S. PATENT DOCUMENTS

| | | | | |
|---|---|---|---|---|
| 3,630,627 | A * | 12/1971 | Low et al. | 356/222 |
| 4,122,383 | A * | 10/1978 | Frosch et al. | 324/752 |
| 4,641,227 | A * | 2/1987 | Kusuhara | 362/231 |
| 6,390,650 | B1 | 5/2002 | Brandt et al. | |
| 6,946,858 | B2 * | 9/2005 | Matsuyama | 324/752 |
| 2004/0020529 | A1 | 2/2004 | Schutt et al. | |

FOREIGN PATENT DOCUMENTS

| | | |
|---|---|---|
| JP | 06-105280 B1 | 4/1994 |
| JP | 08-235903 A | 9/1996 |
| JP | 09-306201 A | 11/1997 |

OTHER PUBLICATIONS

Axel Schonecker, et al., "Influence of Non-uniform Illumination on Spectral Response and Efficiency Measurements of large Area Solar Cells", Proceedings of the photovoltaic Specialists Conference, Las Vegas, Oct. 7-11, 1991, new York, IEEE, US, vol. 2 Conf. 22, Oct. 7, 1991, pp. 203-208.

G. Sala, et al., "Continuous Irradiance Solar Simulator to Characterize Photovoltaic Modules", Proceedings of the Mediterranean Electrotechnical Conference (MELECON), Madrid, Oct. 8-10, 1985. Solar Energy, New York, IEEE, US, vol. 4, 1985, pp. 129-132.

European Search Report dated Jun. 13, 2006; Application No. 06001949.4-2216.

* cited by examiner

MEASUREMENT METHOD OF THE CURRENT-VOLTAGE CHARACTERISTICS OF PHOTOVOLTAIC DEVICES, A SOLAR SIMULATOR FOR THE MEASUREMENT, AND A MODULE FOR SETTING IRRADIANCE AND A PART FOR ADJUSTING IRRADIANCE USED FOR THE SOLAR SIMULATOR

TECHNICAL FIELD

The present invention relates to
a measurement method in which it is possible to measure the current-voltage characteristics of the photovoltaic devices by an equalized irradiance, a solar simulator for the measurement, a module for setting irradiance, a member for adjusting irradiance and a part for adjusting irradiance used for the measurement method by the solar simulator.

BACKGROUND ART

There is a growing demand for the photovoltaic devices as the importance thereof has been recognized more and more as a clean energy source. The fields where the demand for the photovoltaic devices has increased are various and range from power energy sources of large equipments to small-sized power supplies for the precision electronic devices. In this specification, the term "photovoltaic devices" indicates both a photovoltaic device module (hereinafter sometimes referred to simply as a "module") and a photovoltaic cell (hereinafter sometimes referred to simply as a "cell").

Wide application of the photovoltaic devices in various fields is expected to meet various inconveniences on the part of the photovoltaic devices user unless the characteristics or especially the current-voltage characteristics of the photovoltaic devices are accurately measured.

For that reason, a pseudo-sunlight radiator (hereinafter after referred to as a solar simulator) to measure the current-voltage characteristics of the photovoltaic devices has conventionally been proposed and used in practical applications. Nevertheless, there still exist problems to be solved.

Specifically, the solar simulator is used to radiate the artificial light (pseudo-sunlight) of equalized irradiance on the test plane of photovoltaic devices in panel form and thus measure the current-voltage characteristics of the photovoltaic devices. Though the lamp is assumed to be a form considered as a spot or a line, it is very difficult to radiate the light with the equalized irradiance to the whole test plane (or whole area) of the photovoltaic devices.

In the prior art, efforts have been made to improve the problem of light emitted with equalized irradiance mentioned above. However, most of the methods thus far developed are no more than an improvement of the optical system or the light-emitting (lighting) circuit system of the light source.

Improvements in the optical system or the light-emitting circuit system of the light source of the solar simulator have been proposed in Patent Documents 1 to 3. In spite of the improved light source, it has been difficult to improve the locative unevenness of irradiance on the test plane of the object to be measured by less than ±2 to ±3%.

In the ordinary measurement of the photovoltaic device module, the irradiance to the effective plane section is set at $1000W/m^2$. FIG. 1 is a diagram showing the I-V curve indicating the current-voltage characteristics of the object to be measured (photovoltaic device module) irradiated by such irradiance comes to graphically the form illustrated in FIG. 1. In this diagram, I designates the current, and V the voltage.

When the locative unevenness of irradiance on the test plane is given out by the irradiated light of the solar simulator, the I-V curve changes as shown on FIG. 2., and therefore the current-voltage characteristics of the photovoltaic devices cannot be measured correctly.

Incidentally, the FIG. 2 shows a comparison of the I-V curve in the five types of a 96 serial module that is a photovoltaic device module with 96 photovoltaic cells connected in series (herein after it is referred to as the "96 serial module"). The five types of the 96 serial module mean a type of the 96 serial module having 0 cell shaded by 10% (i.e.the state without the locative unevenness of irradiance) and four types of the 96 serial module having 1 cell, 2 cells, 3 cells and 10 cells, shaded by 10% respectively (i.e. the state with unevenness of irradiance of different degrees made artificially).

Curve (a) indicates the ideal state in which the locative unevenness of irradiance on the test plane is less than ±1.0%.

Curves (b) to (e) is I-V curves of the 96 serial modules in which the locative unevenness of irradiance of different degree is made artificially using 1, 2, 3 and 10 object cells shaded by 10%.

As shown in the diagram of FIG. 2, when a change in the I-V curve due to the locative unevenness of irradiance is given out, the form factor FF=Pmax/Isc×Voc (where Pmax is the maximum output of the module, Isc the shorting current, and Voc the open-circuit voltage) changes even for the photovoltaic cells of the same configuration. This point is explained with reference to FIG. 3.

The FIG. 3 shows the changes of the form factor FF and the Pmax value according to the quantity of cell shaded by 10% in the above mentioned 96 serial module.

The left side of the ordinate is the FF (form factor in %) value and the right side of the ordinate the Pmax (maximum output, W) value.

The abscissa shows the quantity of cell shaded by 10%, used for making the locative unevenness of irradiance artificially.

The FF value and the Pmax value in accordance with the increase of the quantity of cell are respectively plotted and drawn by a line.

For the module in the ideal state that the locative unevenness of irradiance is less than ±1.0% (i.e. the state that the quantity of shaded cell is 0.), the value Pmax for is 159.1 (W) and the FF value is 70.7%.

On the contrary, for each module having 1 to 4, 6, 8, 10 and 12 shaded cells used for producing artificial locative unevenness of irradiance, the Pmax value is varied from 154.2 to 152.0 (W) and the FF value is also varied between 68.8% and 74.1%.

FIG. 4 shows the changes of the average value of the irradiance in accordance with the varying of the quantity of cells of the 96 serial module in the test module as illustrated in the FIG. 3.

Curve $A_1$ indicates the irradiance ratio between a mean value of the irradiances measured at five points (four points at the four corners of the cell and one point at the center thereof) on the test plane of the module and a mean value of the irradiances of all the cells forming the test plane of the test module in a general measurement method.

Curve $B_1$ indicates the ratio between the Pmax value for zero cell shaded by 10% (no uneven irradiance) and the Pmax value of each module using 1 to 12 cells shaded by 10%.

According to the Curve $A_1$ and the Curve $B_1$, it can be seen that for the module in the ideal state (i.e. with zero shaded cell) without locative unevenness of irradiance (less than ±1.0%), the disparity is very small between the Pmax value ratio and the irradiance ratio. On the other hand, for each test module making artificial uneven irradiance, the disparity between the numerical values of the two curves $A_1$ and $B_1$ is large.

The above describing shows that, it is difficult to measure the correct current-voltage characteristics when there is any locative unevenness on the test plane of the module.

[Patent Document 1] Japanese Patent Provisional Publication No. 8-235903

[Patent Document 2] Japanese Patent Provisional Publication No. 9-306201

[Patent Document 3] Japanese Patent Publication No. 6-105280

DISCLOSURE OF THE INVENTION

Problem to be Solved by the Invention

The problem of the measurement accuracy of the current-voltage characteristics caused by the locative unevenness of irradiance on the test plane cannot be radically solved simply by the improvement in the optical system or the light-emitting circuit system of the light source of the solar simulator for measuring the characteristics of the photovolatic devices.

In view of the situation, the present inventor has vigorously made researches and experiments, and acquired knowledge that the locative unevenness of irradiance can be absorbed or suppressed on the test plane side of the object to be measured.

As the result of that, the present inventor has achieved the present invention.

Namely, the present invention is to provide a measurement method using a solar simulator for measuring the current-voltage characteristics of the photovoltaic devices, and a means for adjusting irradiance and the like used for the solar simulator.

In that solar simulator, the locative unevenness of irradiance on the test plane is radically solved not on the light source unit side but on the test plane side of an object to be measured.

Means for Solving the Problem

A first configuration for the measurement method in this invention aiming at solving the above-mentioned problem is characterized in that, when an object is the photovoltaic devices, and the current-voltage characteristics are measured by a solar simulator equipped with a light source composed of a lamp and a reflector, and a part for setting the object to be measured, in which it is possible to dispose an irradiated test plane of the object to be measured opposite an illuminating surface of said light source, the whole test plane of said photovoltaic devices is divided imaginarily into a plurality of sections and a selected member for adjusting irradiance is disposed opposite the test plane of each imaginary sections so as to equalize or substantially to equalize the irradiance by the light source at every irradiated test plane of the sections, after which light from said light source is directed onto the test plane of the object to be measured.

The member for adjusting irradiance disposed opposite the test plane of the respective sections is held by support means and brought close to said test plane, wherein the member for adjusting irradiance is formed by any one of a shading net, a shading tape and a shading sheet.

According to this invention, the support means for the member for adjusting irradiance is formed by a colorless clear resin plate with high photon optical transparency or a colorless clear glass plate with high photon optical transparency, or by a framework having a lattice-like support pattern along the periphery of the respective members for adjusting irradiance.

A plurality of types of units for adjusting irradiance are prepared in advance, each part for adjusting irradiance comprising a plurality of the members for adjusting irradiance selected in accordance with the size and the quantity of the test planes of the sections imaginarily formed on a plurality of types of photovoltaic devices that are the object to be measured, arranged in a plurality of the support means, a required irradiance adjustment part corresponding to the object to be measured set in the solar simulator.

In the measurement method of the present invention described above, the output of the light source of the solar simulator is adjusted by using a photovoltaic device module for setting the irradiance, the module having the same configuration as the photovoltaic device that is the object to be measured, the test plane of the module divided imaginarily into a plurality of sections, the member for adjusting irradiance disposed on the test plane of each of the imaginary section in order to adjust the output characteristics of the light emitted from the light source of the solar simulator and to correct dispersion of the output characteristics at each imaginary section test plane so that the irradiance at the test plane of the module due to the illuminating light from the light source attains a required value.

The output of the light source of the solar simulator is adjusted by setting the required module for setting irradiance in the part for setting the object to be measured in the solar simulator, the modules for setting irradiance prepared in advance in accordance with a form determined by the size and the quantity of cells of a plurality of types of photovoltaic devices of the object to be measured, the required module for setting irradiance selected in accordance with a form of photovoltaic device to be measured from a plurality of types of modules for setting irradiance.

By setting the required module for setting irradiance in the part for setting the object of the solar simulator, it is possible to raise the efficiency of the tooling change for a plurality of types of photovoltaic devices.

Next, the configuration of a solar simulator using for implementing the measurement method of the present invention is characterized in that, the light from the light source without the locative unevenness of the irradiance, i.e. equalized or substantially equalized, is irradiated to the test plane of the photovoltaic device by using a part for adjusting irradiance set in the solar simulator equipped with a light source composed of a lamp and a reflector, and a part for setting the object in which it is possible to dispose an irradiated test plane of the object to be measured opposite an illuminating surface of said light source, a part for adjusting irradiance comprising a member for adjusting irradiance that is selected for the test plane of each of imaginary section and disposed opposite the test plane of each of imaginary section that the whole test plane of the photovoltaic device is divided imaginarily into a plurality of sections, the light from the light source irradiated to the test plane of the photovoltaic device through the part for adjusting irradiance.

In the solar simulator mentioned above, it is desirable to use a module for setting irradiance in order to check whether or not the irradiance of the light source is proper and adjust the irradiance of the light source before a measurement. For the purpose of that, the preferred configuration of the module for setting irradiance is as follows;

A module for setting irradiance of a solar simulator, characterized in that, the irradiance at the test plane of said module by the light emitted from said light source attains a required value, the module for setting irradiance formed by the same configuration as photovoltaic devices of the object to be measured, the whole test plane of said module divided imaginarily into a plurality of sections, the member for adjusting irradiance disposed on the test plane of each imaginary section in order to adjust the current-voltaic characteristics by the light emitted from the light source of a solar simulator, the dispersion of the current-voltage characteristics in every test plane of each section corrected evenly.

The above mentioned module for setting the irradiance is composed of a plurality of the test plane of each section formed on its test plane by the respective photovoltaic cell comprised of the module for setting irradiance as a unit or by a plurality of photovoltaic cells as a unit.

Further, in the module for setting irradiance, the current-voltage characteristics on the test plane of each section is equalized or substantially equalized by using the module for setting irradiance so as to detect the current-voltage characteristics for a respective photovoltaic cell as a unit composed of the test plane of each section, or for a plurality of photovoltaic cells as a unit.

Further, in the module for setting irradiance, a plurality of types of the module for setting irradiance are prepared in advance in accordance with a form determined by the size and the quantity of cells of a plurality of types of photovoltaic devices of the object to be measured, and the required module for setting irradiance is selected in accordance with the form of the photovoltaic devices of the object to be measured, and set in the part for setting the object of the solar simulator.

By setting the required module for setting irradiance in the part for setting the object of the solar simulator, it is possible to raise the efficiency of the tooling change for a plurality of types of photovoltaic devices.

Next, the following is an explanation given for the configuration of a part for adjusting irradiation using to eliminate the locative unevenness of irradiance on the test plane of the solar simulator according to the present invention.

The part for adjusting the irradiance is set in the solar simulator, bringing close to the test plane of photovoltaic devices that is the object to be measured, the part for adjusting irradiance set at the solar simulator comprising a member for adjusting the irradiance and making a support means hold it, the member for adjusting the irradiance selected in accordance with the irradiance of the light from the light source to which the test plane of each imaginary section formed by dividing the whole plane of photovoltaic devices of the object to be measured imaginarily into the plural test plane sections is subjected.

The unit for adjusting irradiance is selected from a plurality of unit for adjusting irradiance in accordance with the object to be measured in the solar simulator and fixed at a part for setting of the part for adjusting irradiance, the unit for adjusting irradiance comprising the member for adjusting irradiance that is selected in advance in accordance with the size and the quantity of the test plane of each section formed respectively on a plurality of types of photovoltaic devices and disposed on a plurality of support means.

By setting the support means to the setting part of the solar simulator, it is possible to raise the efficiency of the tooling change for a plurality of types of photovoltaic devices.

Effects of the Invention

This invention makes it possible to reduce the locative unevenness of irradiance from the light source of a solar simulator on the test plane of photovoltaic devise of the object to be measured less than ±1.0% (though in the prior art, the locative unevenness of irradiance comes to ±2 to ±3%.) by a solution as follows;

In the solar simulator used for the measurement of the current-voltage characteristics of photovoltaic devices equipped with a light source composed of a lamp and a reflector, and a part for setting the object to be measured, in which it is possible to dispose the test plane of the object to be measured opposite the illuminating surface of the light source, the irradiance from the light source is equalized or almost equalized every test plane of each section and the irradiance so equalized is irradiated to the test plane of an object to be measured, the whole test plane of photovoltaic devices is divided imaginarily into a plurality of test plane section and the required members for adjusting irradiance disposed on the test plane of each imaginary divided section.

BEST MODE FOR CARRYING OUT THE INVENTION

Embodiments of the present invention will now be described with reference to the accompanying drawings.

FIG. 5 is a plan view schematically showing an example of a photovoltaic device to which the invention is applicable. FIG. 6 is a longitudinal front sectional view of FIG. 5. FIG. 7 is a sectional view schematically illustrating an example of a solar simulator in the present invention for measuring the current-voltage characteristics by the measurement method of the present invention. FIG. 8 is a perspective view schematically showing an example of the members for adjusting irradiance disposed on the prêt for adjusting irradiance set in the test plane side of the photovoltaic device to be measured by the solar simulator shown in FIG. 7, and an example of a support means thereof. FIG. 9 is a sectional view showing an example of an irradiance setting module. FIG. 10 is a sectional view showing another example of the module for setting irradiance. FIG. 11 is a sectional view showing an example of application of the module for setting irradiance shown in FIG. 10.

In the photovoltaic device (hereinafter referred to as the "module Ms") providing a measuring object shown in FIGS. 5, 6, a plurality of photovoltaic cells Cs (hereinafter referred to as the "cells Cs") are arranged and connected in series. In the two diagrams, a rectangular frame 1 has a test plane side 2 of a transparent plate of glass or the like, and as shown, the cells Cs are buried in a sealing material 3 of EVA or the like placed on the light-receiving side 2. The surface of the sealing material 3 is covered with a backing member 4 of a resin sheet or the like thereby to form an example of a module Ms. Each lead wire Rs connecting each cell Cs is called a ribbon or a tab. Numeral 5 designates an output electrode (terminal) of the module Ms.

The test plane side 2 of the module Ms is disposed opposite the light radiation side of a light source of a conventional solar simulator. The light is radiated to the module Ms from the light source and the current-voltage characteristics thereof are measured by detecting through the output terminal 5. In this measurement method, however, the light radiated to the test plane side 2 from the light source has a locative unevenness of irradiance, and it is difficult to improve the measurement accuracy of the current-voltage characteristics, as described above.

The light source 6 shown in FIG. 7 is configured of, for example, a housing 6a made of a shading material and formed with an upper surface opened for making the light penetrate, a lamp 6b, that is, a light source disposed at about the center in the housing 6a, a reflector 6c disposed under the lamp 6b, whose cross section is an arc, a reflector 6d disposed at the upper surface side of the lamp 6b and a filter 6e for adjusting spectrum disposed over the reflector 6d.

The thing indicated by 6f is a member for roughly adjusting the light amount. However, it is selectively used if necessary. It depends on the type of the lamp used for the light source 6 to use the filter 6e for adjusting spectrum or not to use.

In the conventional solar simulator, a part for setting an object to be measured (not shown in FIG. 7) is disposed on the upper side of the light source 6 as shown in FIG. 7, wherein the module Ms providing an object of measurement is disposed downward on the test plane side 2 faced in the part for setting the object and supported by the part for setting the object.

The conventional solar simulator is equipped with a unit for measuring the current-voltage characteristics and a power supply.

However, the pseudo sunlight Bs radiated from the light source unit 6, however, causes the locative unevenness of irradiance among different areas on the test plane side 2 of the module Ms and the locative unevenness of irradiance prevent a high-accuracy measurement of the current-voltage characteristics.

According to the present invention, the locative unevenness of irradiance is suppressed or eliminated by the part for adjusting irradiance Lc brought close to the test plane side 2 of the object. This point is explained below.

In forming the part for adjusting irradiance Lc according to the present invention as illustrated in FIG. 8, first, the module Ms illustrated in FIGS. 5, 6 is formed with the test plane sections virtually defined for each cell Cs. Specifically, in FIG. 5, each cell Cs forming the module Ms as a matrix having five column sections A to E and four row sections i to iv constitutes an unit of the test plane section according to the present invention.

As for the above-mentioned module Ms having the divided test plane sections, a translucent plate (not shown in the figure), having the same form of the test plane sections as the test plane of the module Ms, is set in the part for setting the object to be measured in the solar simulator Ss.

The translucent plate is made of a translucent material such as acrylic.

The current-voltage characteristics of each test plane section are measured by means that a reference cell for irradiance measurement is sequentially located on each test plane section of the translucent plate.

In this way, the degree of locative unevenness of irradiance of the light emitted from the light source 6 is detected for each area (each test plane section), and an area (section) with the lowest irradiance is specified on the translucent plate.

Next, a support means 7 is formed as illustrated in FIG. 8.

The translucent member having the same specification as the aforementioned translucent plate is used for the support means.

The test plane section 8D is specified at the darkest irradiance of the same test plane sections as the test plane of the above-mentioned translucent plate on the support means 7.

Based on the irradiance of the test plane section 8D, the members for adjusting irradiance are disposed on the test plane of each section in this support means 7 to meet the irradiance of the other test plane sections to the reference irradiance. However, the member for adjusting irradiance is not disposed on the test plane section 8D.

The FIG. 8 shows an example for the part for adjusting irradiance Lc in the present invention formed by disposing three types of members for adjusting irradiance 8 (8a to 8c) having different shading rates to the other test plane sections of the support means 7. In place of the translucent plate, a jig can be used in the form of a grid frame having the contour similar to each test plane section to allow the reference cell to be sequentially set.

For the convenience of explanation, FIG. 8 schematically shows a model in which the part for adjusting irradiance Lc comprises the members for adjusting irradiance 8a to 8c having three different shading rates to meet the irradiance of each test plane section to that of the darkest test plane section 8D as the reference irradiance. Nevertheless, the quantity or size of the test plane sections or the types of the members for adjusting irradiance 8 as used are not limited to those of the shown model.

The part for adjusting irradiance Lc comprising the members for adjusting irradiance 8a to 8c for equaling the irradiance of the test plane sections and the supporting means 7 on which the members for adjusting irradiance 8a to 8c are disposed, as shown in FIG. 7, is arranged at a point about 50 to 100 mm in proximity (one example) to the test plane side 2 of the module Ms set in the solar simulator Ss. Under this condition, the light from the light source 6 is radiated to the module Ms and the current-voltage characteristics of the module Ms as a whole are measured. Thus, the measurement of the current-voltage characteristics without the locative unevenness of irradiance on the test plane is made possible.

The members for adjusting irradiance 8a to 8c used with the part for adjusting irradiance Lc may be shading nets having different mesh densities (different shading rates) coated to suppress the reflection, shading tapes formed with holes over the whole surface thereof having different shading rates or shading sheets adjustable to reduce the light transmission area for each test plane section. Also, the support means 7 is a plastic or glass plate having a high photon optical transparency, or a grid-like frame plate formed in a hole pattern similar to the contour of each member for adjusting irradiance 8.

The light equalized without locative unevenness of irradiance can be radiated from the light source 6 to the test plane (the test plane side 2) of the object module Ms by using the part for adjusting irradiance Lc in the solar simulator Ss illustrated in FIG. 7. In this case, the light amount on the test plane of the module Ms is so adjusted to eliminate the locative unevenness of irradiance over the whole test plane thereof using the members for adjusting irradiance 8 having the shading characteristic, and therefore the test plane of the module Ms is required to be verified that the irradiance of the test plane attains a reference irradiance (say, 1000 W/m$^2$).

In the present invention, a module for setting irradiance $M_L$ having the same configuration as the object module Ms is formed as illustrated in FIG. 9. Specifically, in the module for setting irradiance $M_L$ of the FIG. 9, the test plane sections are formed on the test plane side 2, and the members for adjusting irradiance 8 with different shading rates are disposed in accordance with the dispersion of the current-voltage characteristics of the cells on the test plane sections.

Then, whether or not the irradiance from the light source 6 accepted on all test plane of this module $M_L$ satisfies the required value (say, 1000 W/m$^2$) is examined by measuring the current-voltage characteristics taken out from an output terminal. Based on the result of this verification, the output of the light source unit 6 is adjusted to satisfy the required value.

The module for setting irradiance $M_L$ shown in FIG. 9 comprises the selected cells Cs with the same configuration as the object module Ms, but has the dispersion of about ±2 to ±3% in the current-voltage characteristics. In order to suppress or eliminate the dispersion of the current-voltage characteristics of the cells Cs, the members for adjusting irradiance 8 are disposed on the surface of the test plane side 2 for the respective test plane sections (the cells Cs, in this case).

Thereby, the irradiance to the test plane of the module for setting irradiance $M_L$ is measured and examined by detecting the current-voltage characteristic of the whole test plane subjected to the illuminating light of the light source from the single output terminal 5 of the module $M_L$.

According to the present invention, it is possible to make the irradiance on the test plane of the object module Ms set to the required value by the following steps.

As shown in FIG. 10, at first, a check terminal Tc in each of the respective cells Cs is led out of this module $M_L$ from all of the cells Cs forming the module $M_L$.

Next, the current-voltage characteristics in each of the respective cells Cs is measured at each terminal Tc, and the member for adjusting irradiance 8 disposed on the test plane side 2 in each of the respective cells Cs is selected by the result of measuring. Then, the irradiance on the test plane of the object module Ms is set to the required value by using the module for setting irradiance ML adjusted so that the dispersion of the current-voltaic characteristics in each of the cells Cs are eliminated.

In the module for setting irradiance $M_L$ with the terminal (electrode) Tcled out of the module for each cell Cs as illustrated in FIG. 10, the terminals Tc of the cells Cs are connected in series using the connection leads Tr as shown in FIG. 11 to form a module $M_L$ having the same connection as the module for setting irradiance $M_L$ shown in FIG. 9, and the irradiance of the whole test plane can be confirmed by using this module $M_L$.

According to the present invention, the module $M_L$ is set in the part for setting the object to be measured of the solar simulator Ss shown in FIG. 7, and after adjusting the irradiance of the light emitted from the light source unit 6, the current-voltage characteristics of the object module Ms are measured based on the light of the light source 6.

In FIG. 11, the same component elements and members as those in FIGS. 9, 10 are designated by the same reference numerals, respectively.

As described above, according to the present invention, the irradiance of the test plane of the module Ms is equalized by using the part for adjusting irradiance Lc comprising the members for adjusting irradiance 8 in the vicinity of the test plane 2 of the module in the part for setting the object module Ms of the solar simulator Ss, and the light is radiated to the whole test plane from the light source 6 without locative unevenness of irradiance so as to measure the current-voltage characteristics thereby.

Also, according to the present invention, the module for setting irradiance $M_L$ is set in the part for setting the object of the solar simulator and the irradiance of the test plane side is measured in advance whether the irradiance of the light emitted from the light source 6 and radiated to the test plane side 2 of the object module Ms has the required irradiance level, and adjusted by the result of the measuring.

The illuminating light without the locative unevenness of irradiance can be irradiated on the object module Ms at the required predetermined irradiance and the current versus voltage characteristics of the object module Ms can be measured.

Further, according to the present invention, a plurality of types of the part for adjusting irradiance Lc and the module for setting irradiance $M_L$ are prepared as a unit in advance in accordance with the form of the object module Ms (size and quantity of cells of the module).

By doing that, in every time the type of the object module Ms is changed, it is possible to select an appropriate unit from a plurality of types of the part for adjusting irradiance Lc and the module for setting irradiance $M_L$ as unitized and adopt a plurality of types of the measurement aspect.

In that way, whenever the type of the object module Ms is changed, the measurement of the current-voltage characteristics can be realized substantially without any readjustment.

INDUSTRIAL APPLICABILITY

In the conventional solar simulator, in spite of the attempt to realize the equality of irradiance by improving the optical system or the light-emission circuit of the light source, the locative unevenness of irradiance on the test plane could not be reduced to less than ±2% to ±3%.

The present invention makes it possible to eliminate or suppress the locative unevenness of irradiance on the test plane by dividing the whole test plane of the photovoltaic device imaginarily into small sections to be able to detect whether or not the irradiance attains the required value on the test plane sections divided respectively as an unit and make it easy to adjust the irradiance if it does not attain the required value.

Thus, the present invention has the advantages as mentioned the following items of (1) to (4);

(1) The output characteristics of the photovoltaic device can be measured with high accuracy.
(2) The dispersion of the form factor FF according to the "locative unevenness of irradiance on the test plane" can be reduced as far as possible.
(3) The irradiance can be adjusted directly for each intended section (small area), and therefore the locative unevenness of irradiance can be eliminated easily with high accuracy by adjustment.
(4) In accordance with the form of the photovoltaic device providing the object of measurement, the part for adjusting irradiance and the module for setting irradiance are prepared in advance. By doing so, when the configuration or the form of the object module is changed, it is possible to select the part for adjusting irradiance and the module for setting irradiance corresponding to the configuration and the form of each module from them and use. Thus, a high-accuracy measurement can be realized in quick response to the change of each object module.

DESCRIPTION OF REFERENCE NUMERALS AND CHARACTERS

Figure 1:
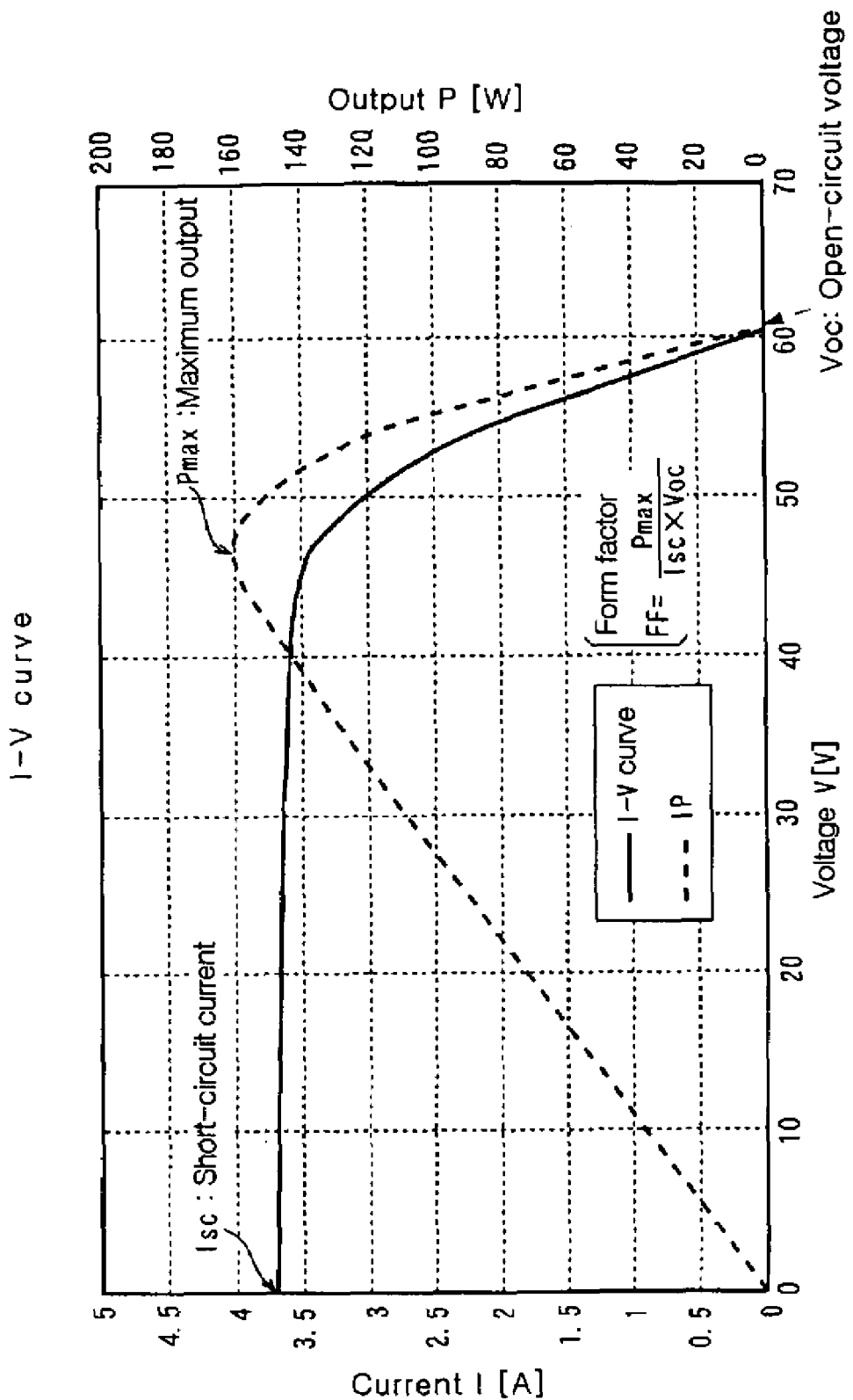
[FIG. 1] A diagram showing an example of the current-voltage characteristics (I-V curve) of a photovoltaic module.
Figure 2:
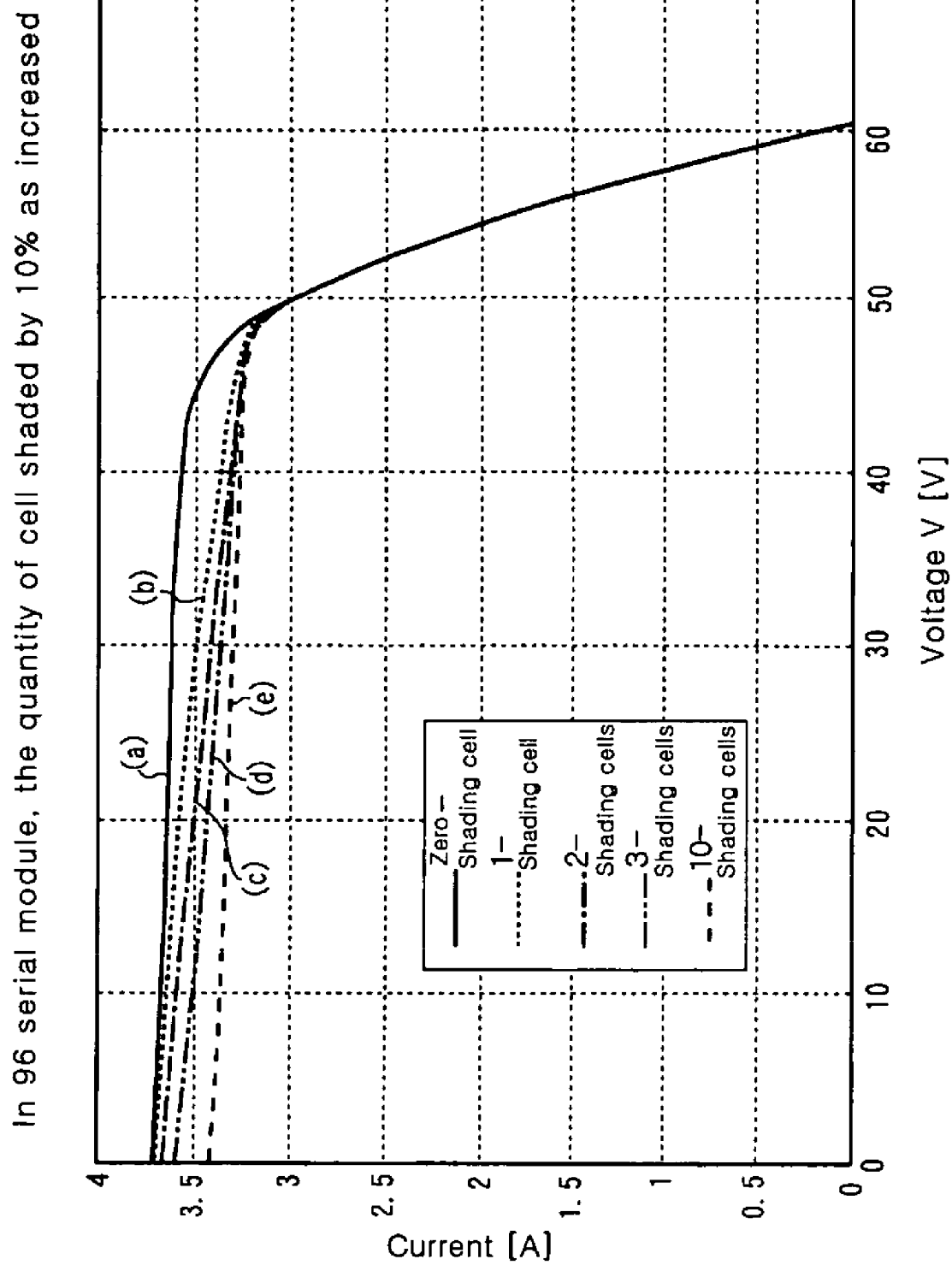
[FIG. 2] A diagram showing an example of the current-voltage characteristics affected by locative unevenness of irradiance.
Figure 3:
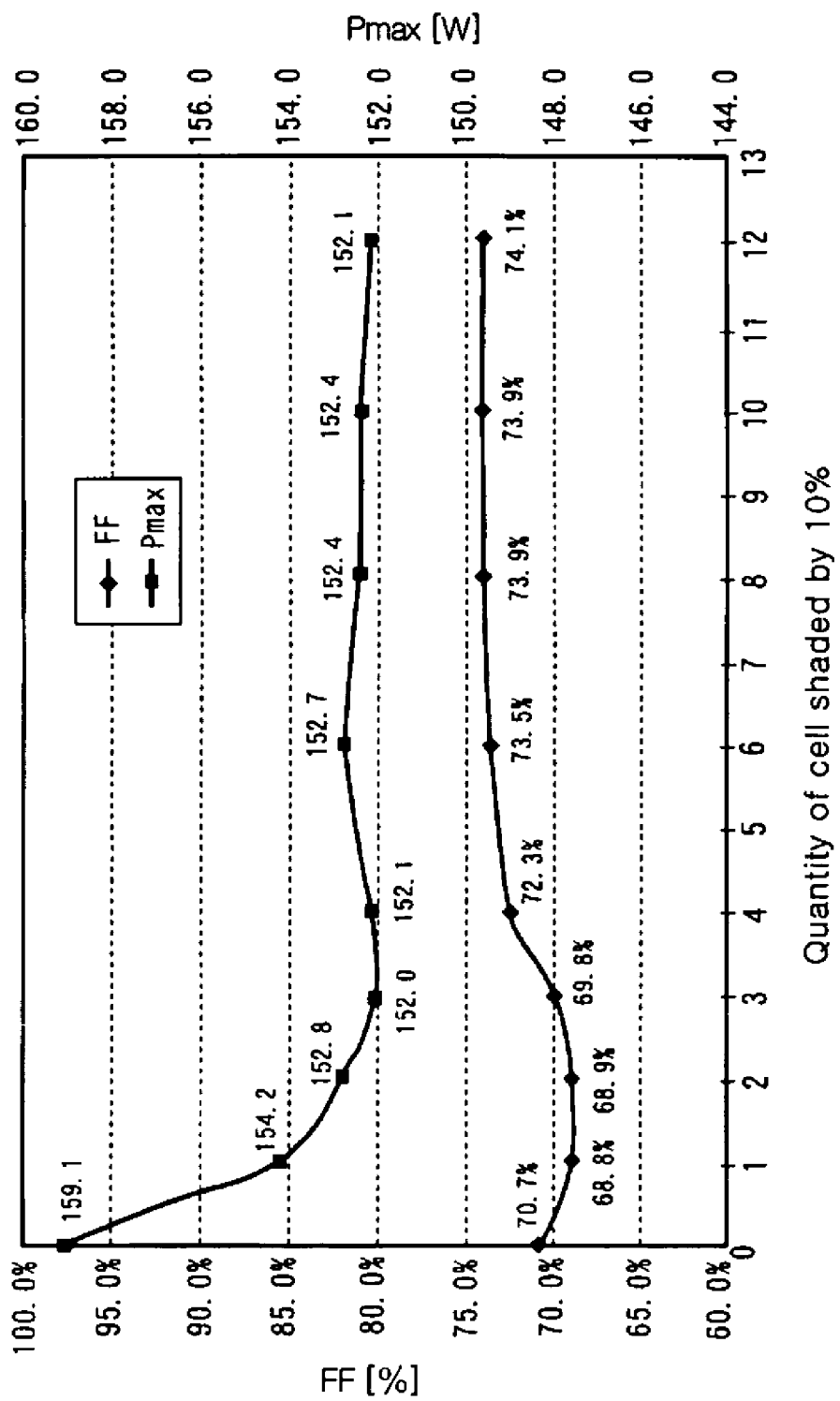
[FIG. 3] A diagram for explaining the degree that the locative unevenness of irradiance effects to the current-voltage characteristics.
Figure 4:
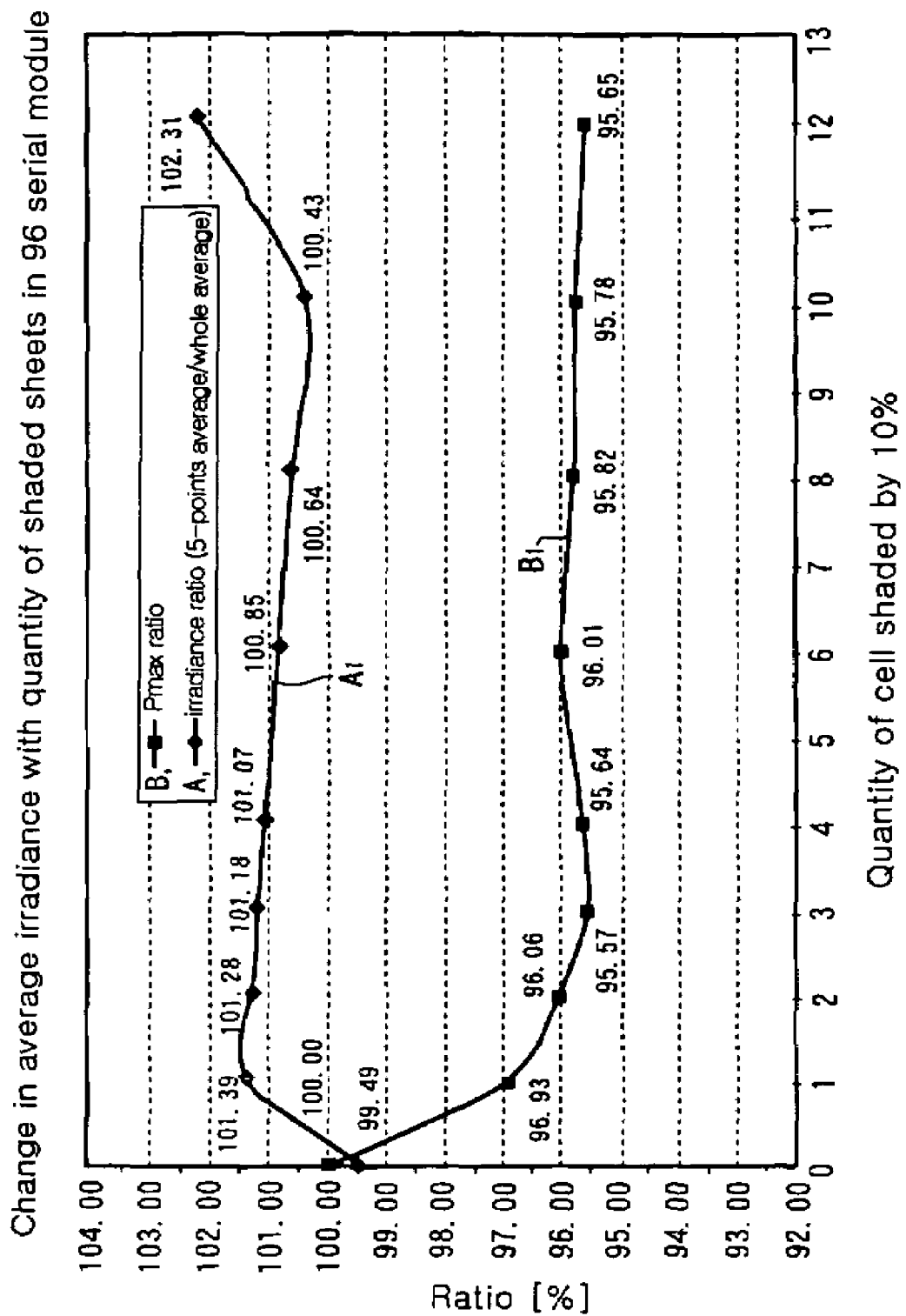
[FIG. 4] A diagram illustrating the irradiance ratio and the Pmax value ratio of the test module shown in FIG. 3.
Figure 5:
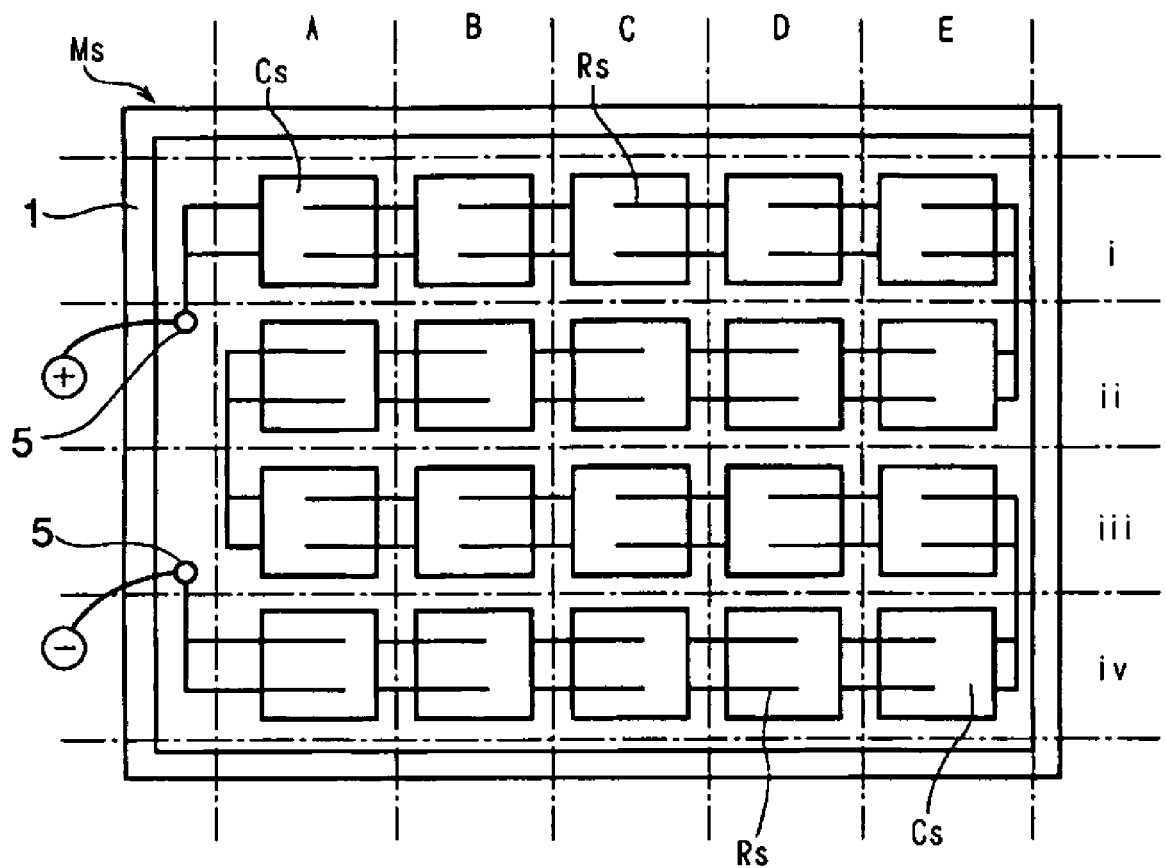
[FIG. 5] A plan view schematically showing an example of the photovoltaic device applied to the present invention.
Figure 6:
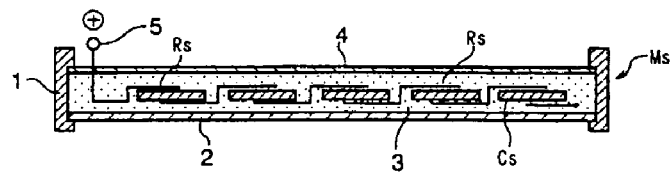
[FIG. 6] A longitudinal front sectional view of FIG. 5.
Figure 7:
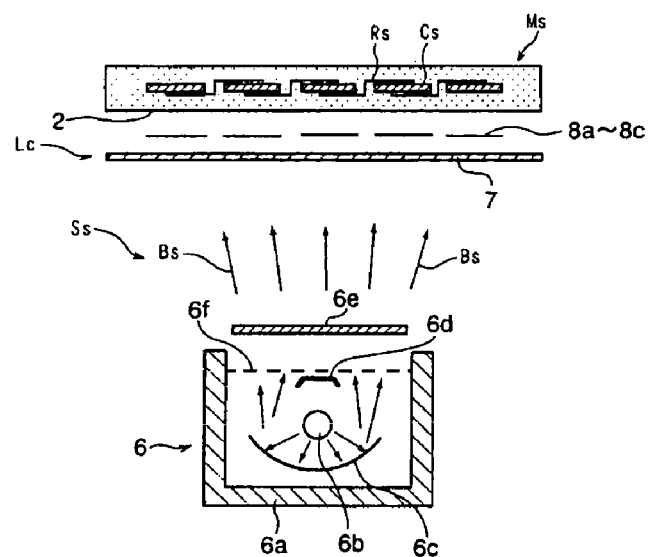
[FIG. 7] A sectional view schematically illustrating an example of the solar simulator according to the invention for measuring the current-voltage characteristics by the method of the present invention.
Figure 8:
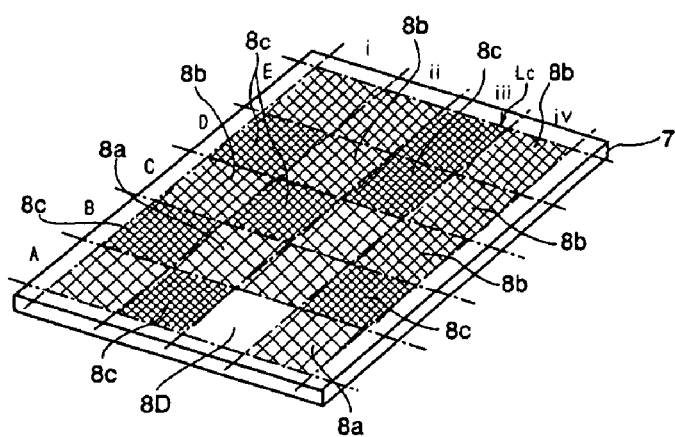
[FIG. 8] A perspective view schematically showing an example of the members for adjusting irradiance of the part for adjusting irradiance and the supporting means thereof set in the solar simulator of FIG. 7.
Figure 9:
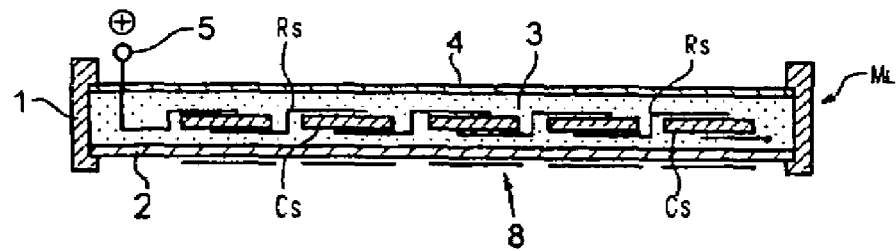
[FIG. 9] A sectional view showing an example of the module for setting irradiance.
Figure 10:
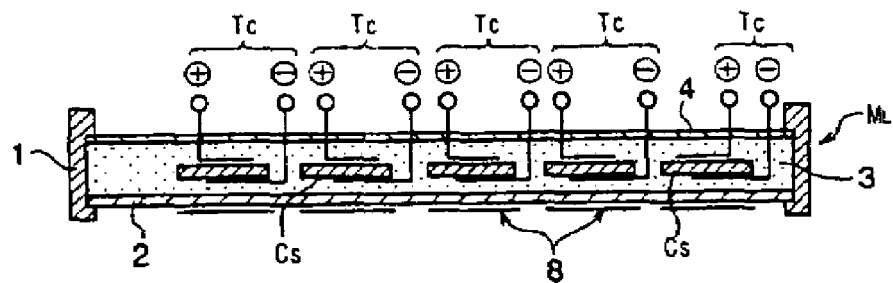
[FIG. 10] A sectional view showing another example of the module for setting irradiance.
Figure 11:
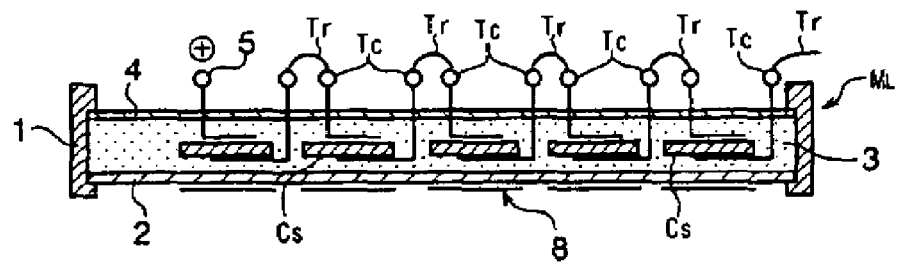
[FIG. 11] A sectional view of an example of the manner in which the module for setting irradiance shown in FIG.10 is used.

Ms photovoltaic module
Cs Cell
Rs Lead
1 Frame
2 the test plane side
3 Seal member
4 Backing member
5 Output electrode (terminal)
6 Light source unit
Lc Part for adjusting irradiance
7 Supporting means
8 Member for adjusting irradiance
$M_L$ Module for setting irradiance

What is claimed is:

1. A measurement method of measuring a current-voltage characteristic of an object to be measured including a plurality of photovoltaic cells using a solar simulator including a light source having a lamp and a reflector, comprising:
   disposing an irradiated test plane of the object to be measured opposite an illuminating surface of said light source;
   dividing a whole of the test plane of the object to be measured into a plurality of imaginary sections corresponding to respective photovoltaic cells;
   disposing members for adjusting irradiance opposite respective imaginary sections of the test plane so as to equalize or to substantially equalize irradiance of the object to be measured by the light source at respective sections of the test plane corresponding to the imaginary sections; and
   directing light from said light source onto the test plane of the object to be measured,
   wherein the object to be measured produces the current-voltage characteristic to be measured in response to said light.

2. A measurement method according to claim 1, further comprising:
   holding the members for adjusting irradiance disposed opposite the test plane by support means; and
   bringing the members for adjusting irradiance close to said test plane.

3. The measurement method according to claim 2, further comprising:
   forming the support means for the members for adjusting irradiance with a colorless clear resin plate with high photon optical transparency or a colorless clear glass plate with high photon optical transparency, by a framework having a lattice-like support pattern along the periphery of the respective members for adjusting irradiance.

4. The measurement method according to claim 3, further comprising:
   adjusting an output of the light source of the solar simulator using a photovoltaic module for setting the irradiance, the photovoltaic module having the same configuration as the photovoltaic cells of the object to be measured;
   dividing a test plane of the photovoltaic module into a plurality of imaginary sections corresponding to respective photovoltaic cells; and
   disposing the members for adjusting irradiance on the test plane at positions corresponding to each imaginary section in order to correct dispersion of output characteristics of the photovoltaic cells so that the irradiance at the test plane of the photovoltaic cells of the object to be measured due to the illuminating light from the light source attains a required value.

5. The measurement method according to claim 2, further comprising:
   adjusting an output of the light source of the solar simulator using a photovoltaic module for setting the irradiance, the photovoltaic module having the same configuration as the photovoltaic cells of the object to be measured;
   dividing a test plane of the photovoltaic module into a plurality of imaginary sections corresponding to respective photovoltaic cells; and
   disposing the members for adjusting irradiance on the test plane at positions corresponding to each imaginary section in order to correct dispersion of output characteristics of the photovoltaic cells so that the irradiance at the test plane of the photovoltaic cells of the object to be measured due to the illuminating light from the light source attains a required value.

6. The measurement method according to claim 1, further comprising:
   forming the respective members for adjusting irradiance with any one of a shading net, a shading tape and a shading sheet.

7. The measurement method according to claim 6, further comprising:
   adjusting an output of the light source of the solar simulator using a photovoltaic module for setting the irradiance, the photovoltaic module having the same configuration as the photovoltaic cells of the object to be measured;
   dividing a test plane of the photovoltaic module into a plurality of imaginary sections corresponding to respective photovoltaic cells; and
   disposing the members for adjusting irradiance on the test plane at positions corresponding to each imaginary section in order to correct dispersion of output characteristics of the photovoltaic cells so that the irradiance at the test plane of the photovoltaic cells of the object to be measured due to the illuminating light from the light source attains a required value.

8. The measurement method according to claim 1, further comprising:
   preparing a plurality of types of parts for adjusting irradiance in advance, the preparing of respective types of parts for adjusting irradiance comprising
   selecting a plurality of the members for adjusting irradiance in accordance with a size of the test plane and a quantity of the imaginary sections corresponding to respective photovoltaic cells; and arranging the selected members for adjusting irradiance in a support means and forming into a unit.

9. The measurement method according to claim 8, further comprising:

adjusting an output of the light source of the solar simulator using a photovoltaic module for setting the irradiance, the photovoltaic device module having the same configuration as the photovoltaic cells of the object to be measured;

dividing a test plane of the photovoltaic module into a plurality of imaginary sections corresponding to respective photovoltaic cells; and disposing the members for adjusting irradiance on the test plane at positions corresponding to each imaginary section in order to correct dispersion of output characteristics of the photovoltaic cells so that the irradiance at the test plane of the photovoltaic cells of the object to be measured due to the illuminating light from the light source attains a required value.

10. The measurement method according claim 1, further comprising:

adjusting an output of the light source of the solar simulator using a photovoltaic module for setting the irradiance, the photovoltaic module having the same configuration as the photovoltaic cells of the object to be measured;

dividing a test plane of the photovoltaic module into a plurality of imaginary sections corresponding to respective photovoltaic cells; and, disposing the members for adjusting irradiance on the test plane at positions corresponding to each imaginary section in order to correct dispersion of output characteristics of the photovoltaic cells so that the irradiance at the test plane of the photovoltaic cells of the object to be measured due to the illuminating light from the light source attains a required value.

11. The measurement method according to claim 10, further comprising:

adjusting an output of the light source of the solar simulator by setting the required module for setting irradiance in a part for setting the object to be measured in the solar simulator;

preparing the modules for setting irradiance in advance in accordance with a form determined by a size and a quantity of cells of a plurality of types of photovoltaic devices of the object to be measured; and selecting the required module for setting irradiance in accordance with a form of photovoltaic device to be measured from a plurality of types of modules for setting irradiance.

* * * * *